(12) United States Patent
Howson

(10) Patent No.: US 10,861,229 B2
(45) Date of Patent: Dec. 8, 2020

(54) ASSEMBLING PRIMITIVE DATA INTO MULTI-VIEW PRIMITIVE BLOCKS IN A GRAPHICS PROCESSING SYSTEM

(71) Applicant: Imagination Technologies Limited, Kings Langley (GB)

(72) Inventor: John W. Howson, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/220,350

(22) Filed: Dec. 14, 2018

(65) Prior Publication Data
US 2019/0188907 A1 Jun. 20, 2019

(30) Foreign Application Priority Data
Dec. 14, 2017 (GB) .................................... 1720857

(51) Int. Cl.
*G06T 15/00* (2011.01)
*G06T 11/40* (2006.01)
*G06T 17/10* (2006.01)
*G06T 1/00* (2006.01)

(52) U.S. Cl.
CPC ............ *G06T 17/10* (2013.01); *G06T 1/0007* (2013.01); *G06T 11/40* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 2001/0000963 A1* | 5/2001 | Deguchi | G06T 17/10 345/420 |
| 2003/0117485 A1* | 6/2003 | Mochizuki | G06T 13/40 348/14.01 |
| 2008/0007559 A1 | 1/2008 | Kalaiah et al. | |
| 2014/0176589 A1 | 6/2014 | Duluk et al. | |
| 2014/0354666 A1* | 12/2014 | Yang | G06T 9/005 345/555 |
| 2016/0350892 A1* | 12/2016 | Zhong | H04N 13/275 |
| 2017/0330372 A1 | 11/2017 | Kakarlapudi et al. | |

FOREIGN PATENT DOCUMENTS

| | | |
|---|---|---|
| GB | 2550358 A | 11/2017 |
| WO | 2016/191095 A1 | 12/2016 |

* cited by examiner

*Primary Examiner* — Yanna Wu
(74) *Attorney, Agent, or Firm* — Potomac Law Group, PLLC; Vincent M DeLuca

(57) ABSTRACT

Methods and apparatus for generating a data structure for storing primitive data for a number of primitives and vertex data for a plurality of vertices, wherein each primitive is defined with reference to one or more of the plurality of vertices. The vertex data comprises data for more than one view, such as a left view and a right view, with vertex parameter values for a first group of vertex parameters being stored separately for each view and vertex parameter values for a second, non-overlapping group of vertex parameters being stored only once and used when rendering either or both views.

20 Claims, 7 Drawing Sheets

ASSEMBLING PRIMITIVE DATA INTO MULTI-VIEW PRIMITIVE BLOCKS IN A GRAPHICS PROCESSING SYSTEM

BACKGROUND

Graphics processing systems are used to process graphics data. For example, an application running on a computing system may need to render an image of a three dimensional (3D) scene for display to a user. The application can send graphics data to a graphics processing system to be rendered, wherein the graphics data describes primitives to be rendered. As is known in the art, primitives are usually convex polygons, such as triangles or convex quadrilaterals, wherein a primitive typically has its position in the rendering space of the graphics processing system defined by the position of its vertices, and may have its appearance defined by other attributes such as colour or texture attributes. An object in a scene may be represented by one or more primitives. As graphics processing systems progress, their capability to render complex images improves, and as such applications make use of this and provide more complex images for graphics processing systems to render. This means that the number of primitives in images tends to increase, so the ability of a graphics processing system to process the primitives efficiently becomes more important.

One known way of improving the efficiency of a graphics processing system is to render an image in a tile-based manner. In this way, the rendering space into which primitives are to be rendered is divided into a plurality of tiles, which can then be rendered independently from each other. In order to render primitives, a rendering unit uses memory to store intermediate results (e.g. depth values and primitive identifiers, etc.) for different sample positions. If the rendering unit operates on a tile at a time then most (or all) of this memory can be situated "on-chip", i.e. on the Graphics Processing Unit (GPU), which might not be possible if the whole rendering space is rendered at once. Therefore, in a tile-based graphics system, the number of read and write operations between the GPU and an off-chip memory (i.e. which may be referred to as "system memory") is typically reduced compared to a non-tile-based graphics system. Since read and write operations between the GPU and the system memory are typically very slow and use lots of power (compared to operations performed within the GPU), tile-based graphics systems are often more efficient (in terms of power and speed) than non-tile-based graphics systems.

A tile-based graphics system includes a tiling unit to tile the primitives. That is, the tiling unit determines, for a primitive, which of the tiles of a rendering space the primitive is in. Then, when a rendering unit renders the tile, it can be given information indicating which primitives should be used to render the tile. In some tile-based graphics systems, a tiling unit generates data blocks, referred to as primitive blocks, which contain primitive data and these are written to memory and read by the rendering unit. The primitive data in a primitive block may comprise data for a plurality of vertices and data for a plurality of primitives. As described above, a primitive is defined by the position of its vertices and hence the data for a primitive (e.g. in a primitive block) may reference the vertex data for a plurality of vertices within the same primitive block.

As the complexity of graphics data and the speed of display increases, the amount of vertex data that is used per second in a computer graphics system for rendering images increases and the memory space for storing the primitive blocks (which contain the vertex data) used in a 3D render can easily reach hundreds of MB.

The embodiments described below are provided by way of example only and are not limiting of implementations which solve any or all of the disadvantages of known methods of generating and storing primitive blocks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A data structure for storing primitive data is described along with methods and apparatus for generating the data structure. The data structure comprises primitive data for a number of primitives and vertex data for a plurality of vertices, wherein each primitive is defined with reference to one or more of the plurality of vertices. The vertex data comprises data for more than one view, such as a left view and a right view, with vertex parameter values for a first group of vertex parameters being stored separately for each view and vertex parameter values for a second, non-overlapping group of vertex parameters being stored only once and used when rendering either or both views.

The graphics processing system described herein may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing system.

There may be provided an integrated circuit manufacturing system comprising: a non-transitory computer readable storage medium having stored thereon a computer readable integrated circuit description that describes the graphics processing system graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
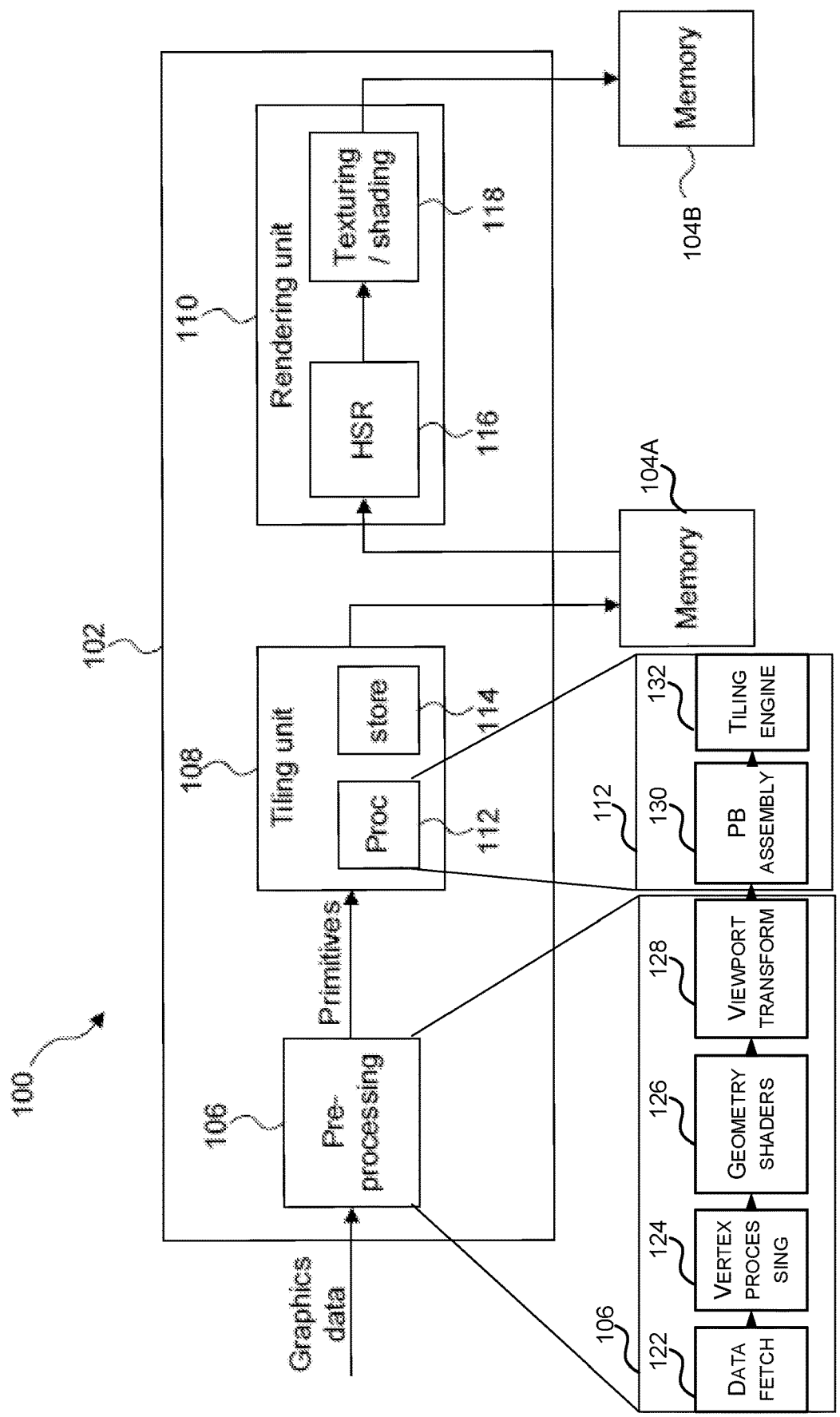
FIG. 1 shows some elements of a tile-based graphics processing system which may be used to render a stereoscopic image of a 3D scene.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, the amount of vertex data that is used per second in a computer graphics system for rendering images can be very large and this can affect the performance of the system, e.g. where it is limited by memory bandwidth (e.g. the bandwidth between a processing unit where the primitive blocks are generated and the memory where the primitive blocks are stored). The amount of data is further increased when rendering multiple views of a scene, for example for stereoscopic rendering. As described above, a tiling unit in a tile-based graphics processing system generates primitive blocks and also determines, for a primitive, which of the tiles of a rendering space the primitive is in. The data associating tiles and primitives with each other may be output from the tiling unit in the form of a display list (which may alternatively be referred to as a control list or stream). In typical stereoscopic rendering systems, the tiling unit outputs twice as many primitive blocks (e.g. a set of left primitive blocks and a set of right primitive blocks, with each left primitive block corresponding to one of the right primitive blocks forming a pair of primitive blocks for a particular instance of a scene to be viewed from left and right viewpoints) and twice as many display lists (e.g. a set of left display lists and a set of right display lists, with each left display list corresponding to one of the right display lists forming a pair of display lists for a particular instance of the scene to be viewed from left and right viewpoints).

Described herein is a more efficient method of generating primitive blocks for multi-view rendering which reduces the overall amount of data which is written to memory by a tiling unit and hence reduces the memory bandwidth for memory writes. Also described herein is a new data structure in the form of a new primitive block format for multi-view rendering that increases the efficiency of data storage by reducing the overall memory space required to store all the primitive blocks for multi-view rendering. In particular, the primitive block format includes data for each view (e.g. both the right and left views in stereoscopic rendering) such that dedicated, separate primitive blocks for the separate views are not generated. Whilst the methods and data structure are described below in terms of stereoscopic rendering which comprises two views—a left view and a right view—the methods and data structure can be used wherever there is vertex data for more than one view (e.g. for cube maps), irrespective of how many views are actually rendered. For example, a cube map represents six views of a scene, where each view would typically be composed of the visible scene geometry as viewed from the centre of a cube looking outwards towards each face of the cube. In the case of rendering a cube map the proposed data structure would contain six sets of unique per view data (for example per view position data) and a single set of common data.

FIG. 1 shows some elements of a tile-based graphics processing system 100 which may be used to render a stereoscopic image of a 3D scene. Stereoscopic images of a 3D scene can be created by rendering a "left view" and a "right view" of the scene, corresponding to the views of a scene that would be seen by a viewer's left eye and the viewer's right eye respectively. This can be useful for generating and displaying 3D images to a viewer by making the rendered left view visible to the viewer's left eye and making the rendered right view visible to the viewer's right eye. This can be achieved in a number of different ways, e.g. with the use of glasses worn by the viewer which allow different images to be made visible to the viewer's left and right eyes. This can be done using polarised lenses, coloured lenses or lenses which can simulate fast shutter speeds, to give just some examples. In another example, the viewer may wear a head mounted display such that different images are made visible to the viewer's respective eyes. This can be useful in a virtual reality system or an augmented reality system.

The graphics processing system 100 comprises a graphics processing unit (GPU) 102 and two portions of memory 104A and 104B. It is noted that the two portions of memory 104A and 104B may, or may not, be parts of the same physical memory, and both memories 104A and 104B may be situated "off-chip", i.e. not on the same chip as the GPU 102. Communication between the memories (104A and 104B) and the GPU 102 may take place over a communications bus in the system 100.

The GPU 102 comprises a pre-processing module 106, a tiling unit 108 and a rendering unit 110. The tiling unit 108 comprises processing logic 112 and a data store 114, and the rendering unit 110 comprises a hidden surface removal (HSR) module 116 and a texturing/shading module 118. The graphics processing system 100 is arranged such that graphics data describing a sequence of primitives provided by an application is received at the pre-processing module 106. The pre-processing module 106 performs functions such as geometry processing including clipping and culling to remove primitives which do not fall into a visible view. The pre-processing module 106 may also project the primitives into screen-space. The pre-processing module 106 outputs primitives to the tiling unit 108.

The tiling unit 108 receives the primitives from the pre-processing module 106 and determines which of the primitives are present within each of the tiles of the rendering space of the graphics processing system 100. A primitive may be in one or more of the tiles of the rendering space. The tiling unit 108 assigns primitives to tiles of the rendering space by creating display lists for the tiles, wherein the display list for a tile includes indications of primitives (i.e. primitive IDs) which are present in the tile. The processing logic 112 of the tiling unit 108 performs the operations of the tiling unit 108 and the data store 114 stores data of intermediate results of the tiling process, such as results of tiling calculations and partially filled display lists. The processing logic 112 may be implemented in dedicated hardware designed specifically for performing the operations of the tiling unit 108. Alternatively, at least some of the functionality of the processing logic 112 may be implemented by executing software on a processor wherein the software is written such that when it is executed it causes the processor to perform the operations of the tiling unit 108.

In various examples, once all of the primitives for a render have been tiled then the display lists are complete and they and the primitive blocks are passed to the off-chip memory 104A for storage therein. In other examples, the tiling unit 108 might not use an internal store (such as store 114) to store display lists, and instead primitive identifiers may be written directly to display lists in memory 104A as tiling is performed. Furthermore, in some further examples, the internal store 114 may be implemented in the tiling unit 108, but the internal store 114 might not be big enough to store all of the display lists for all of the tiles at once. Therefore, the internal store 114 may be used to gather tiling results that can then be written out to memory 104A in chunks (or "batches") as the tiling is performed. This can avoid inefficient memory access patterns when primitives are written to different control streams in memory 104A.

The rendering unit 110 fetches the display list for a tile and the primitives relevant to that tile from the memory 104A (i.e. by reading data from a primitive block) and the HSR module 116 performs hidden surface removal to thereby remove fragments of primitives which are hidden in the scene. The remaining fragments are passed to the texturing/shading module 118 which performs texturing and/or shading on the fragments to determine pixel colour values of a rendered image which can be passed to the memory 104B for storage in a frame buffer. The rendering unit 110 processes primitives in each of the tiles and when the whole image has been rendered and stored in the memory 104B, the image can be outputted from the graphics processing system 100 and, for example, displayed on a display.

FIG. 1 also shows an example structure of the pre-processing module 106 and processing logic 112 within the tiling unit 108 in more detail. As shown in FIG. 1, the pre-processing module 106 may comprise a data fetch module 122 which fetches vertex data, a vertex processing module 124, geometry shaders 126 and a viewport transform module 128 which, in conjunction with a perspective divide, transforms the vertices into screen space coordinates. As shown in FIG. 1, the processing logic 112 within the tiling unit 108 may comprise a primitive block assembly module 130 which generates the primitive blocks and a tiling engine 132 which generates the display lists.

In the example shown in FIG. 1, the tile-based graphics processing system 100 is a deferred rendering system, meaning that the rendering unit 110 performs hidden surface removal on a primitive fragment prior to performing texturing and/or shading on the primitive fragment in order to render the scene. However, in other examples, graphics processing systems might not be deferred rendering systems, such that texturing and/or shading is performed on a primitive fragment before hidden surface removal is performed on the primitive fragment.

Figure 2:
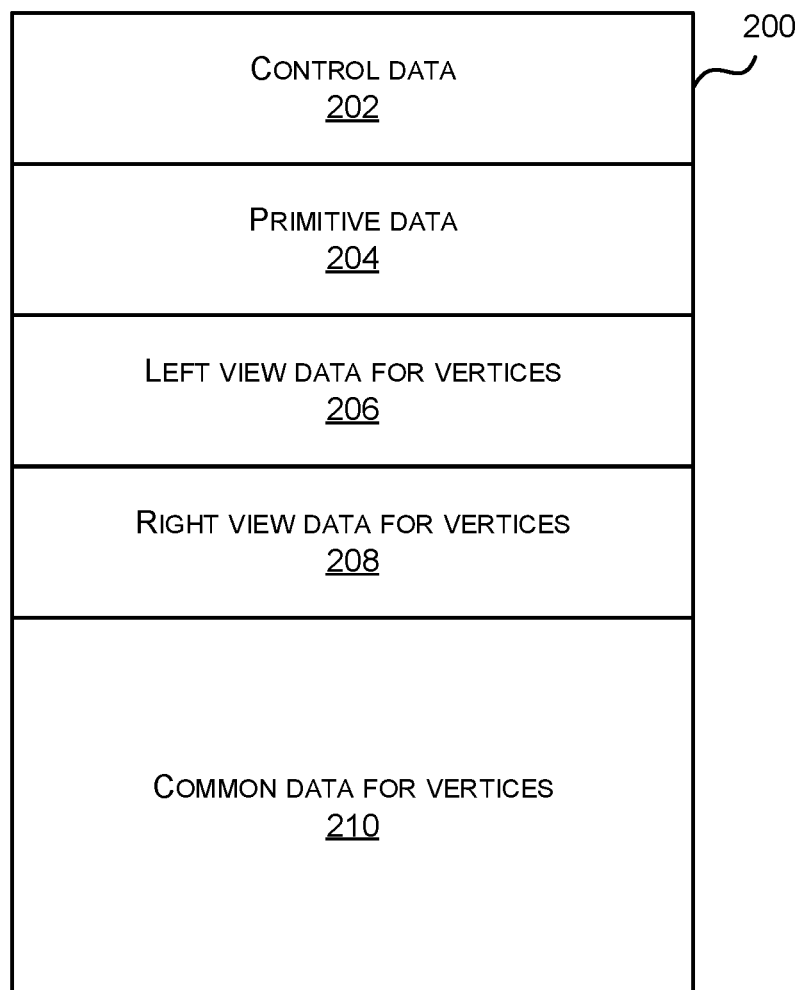
FIG. 2 is a schematic diagram showing the structure of an example primitive block.

The method of generating primitive blocks for multi-view rendering (e.g. stereoscopic rendering) described herein is implemented within the tiling unit 108 of the graphics processing system 100 and this reduces the memory bandwidth for memory writes to the memory 104A. The method and the primitive block format can be described with reference to FIGS. 2 and 3 which relate to stereoscopic rendering (i.e. two views per scene instance) but the method can be easily extended to other multi-view rendering methods, e.g. where more than two views of each scene instance are rendered. FIG. 2 shows the structure of a primitive block 200 which is generated within the tiling unit 108 (e.g. within the primitive block assembly module 130). The primitive block 200 comprises control data 202, primitive data 204 and vertex data 206-210; however, unlike known primitive blocks, instead of storing vertex data for the different views (e.g. for the left and right views) in separate primitive blocks, the vertex data for the two views is stored within the same primitive block and some parts of the vertex data is used only when rendering one of the two views (i.e. the left view data 206 is only used when rendering the left view and the right view data 208 is only used when rendering the right view) and other parts of the vertex data (i.e. the common data 210) is used when rendering either or both of the two views (i.e. the primitive block 200 described herein may be used even where only one of the views is being rendered). This reduces the amount of data which is written to memory. The two views may be generated in the pre-processing module 106 (e.g. within the geometry shading phase 126 or within the vertex processing phase 124 or within the viewport transform module 128 which may transform the vertices into different screen space co-ordinates for the different viewpoints of the different views).

The primitive data 204 defines a plurality of primitives. Each primitive is defined with reference to one or more of a plurality of vertices and the vertex data 206-210 within the primitive block 200 relates to the plurality of vertices. For example, primitive data may define a primitive by indexing a set of vertices (e.g. three vertices for a triangular primitive), for which vertex data (206-210) is stored in the primitive block. Therefore, the primitive data 204 may comprise respective sets of one or more indices to define respective primitives, wherein the indices are references to vertex data (206-210) stored in the primitive block 200.

The left and right view data for vertices 206, 208 comprises position data for each of the plurality of vertices, such that the primitive block 200 comprises two sets of position data for each vertex—one set of position data in the left view data 206 and the other set of position data in the right view data 208, e.g. corresponding to the different positions of the vertex in the rendering spaces of the views as a result of the different viewpoints of the different views. Whilst the left and right view data 206, 208 is shown in FIG. 2 as separate contiguous blocks within the primitive block 200, in other examples the left and right view data 206, 208 may be interleaved, e.g. such that the primitive block 200 comprises left view data for vertex 1 followed by right view data for the same vertex (i.e. vertex 1), then left view data for the next vertex (vertex 2) followed by right view data for that same vertex (i.e. vertex 2), etc. Interleaving data for the different views in this way may reduce the amount of data which is read from memory (e.g. by the rendering unit 110 from memory 104A) if the left and right views are rendered simultaneously because the data for the second view remains in the cache and can be used without being re-read.

The position data for a vertex (which is stored separately for the left and right views) may comprise X, Y, Z and W parameters, where the X and Y parameters comprise X and Y coordinates to indicate a screen location, the Z parameter indicates the depth of the vertex and the W parameter is a Reciprocal Homogeneous W (RHW) value used for texturing and shading. A homogenous point given by the values (X,Y,Z,W) defines the location of the vertex in projection space for a particular view.

In various examples the left and right view data for vertices 206, 208 may comprise additional parameters for each vertex (i.e. in addition to the position data described above), for example, data relating to screen space reflections (e.g. because the left and right views may have different reflection vectors), a view vector and/or any number of other parameters as required by the techniques the application that is generating the data is using.

The common data for the vertices 210 comprises those parameters which are the same for both the left and right views for each of the plurality of vertices and which are only stored once in the primitive block 200. The common data may, for example, comprise attribute data such as one or more parameters which may be used in a programmable shader language (e.g. by a pixel shader) to calculate the colour of a pixel. For example, vertex attribute data can be used as texture coordinate sets U, V and S, T, colour, normal, etc. in a pixel shader. U, V, S and T are texture coordinates used to map textures onto primitives.

The values of vertex parameter data for X, Y, Z, RHW and texture coordinates U, V, S and T may be in IEEE floating point format. A value of IEEE floating point has 32 bits (4 bytes), with 8 bits for the exponent and 23 bits for the mantissa plus 1 bit for the sign.

In various examples, the vertex parameter data which is provided separately for each view may comprise 16 bytes of data for each vertex and for each view, whereas the vertex parameter data which is stored in the common data portion 210 and used for both views may be significantly larger, e.g. 64 bytes for each vertex or more (e.g. in some examples, the total vertex data size, including the parts that reside in both the per view and common data portions may be as much as 512 bytes). By using the primitive block structure as shown in FIG. 2 and described above, duplication of the bulky common data portion 210 is avoided and hence memory usage and memory bandwidth is reduced compared to having separate primitive blocks for the different views.

In various examples, the split between vertex parameters which are stored separately for the left and right views (in the left view data portion 206 and right view data portion 208 of the primitive block) and vertex parameters which are stored only once for both views (in the common data portion 210) may be the same for all primitive blocks and may be predetermined. In other examples, however, the control data 202 in a primitive block 200 may include data identifying which vertex parameters are provided separately and/or which vertex parameters are provided only once for both views.

Figure 3:
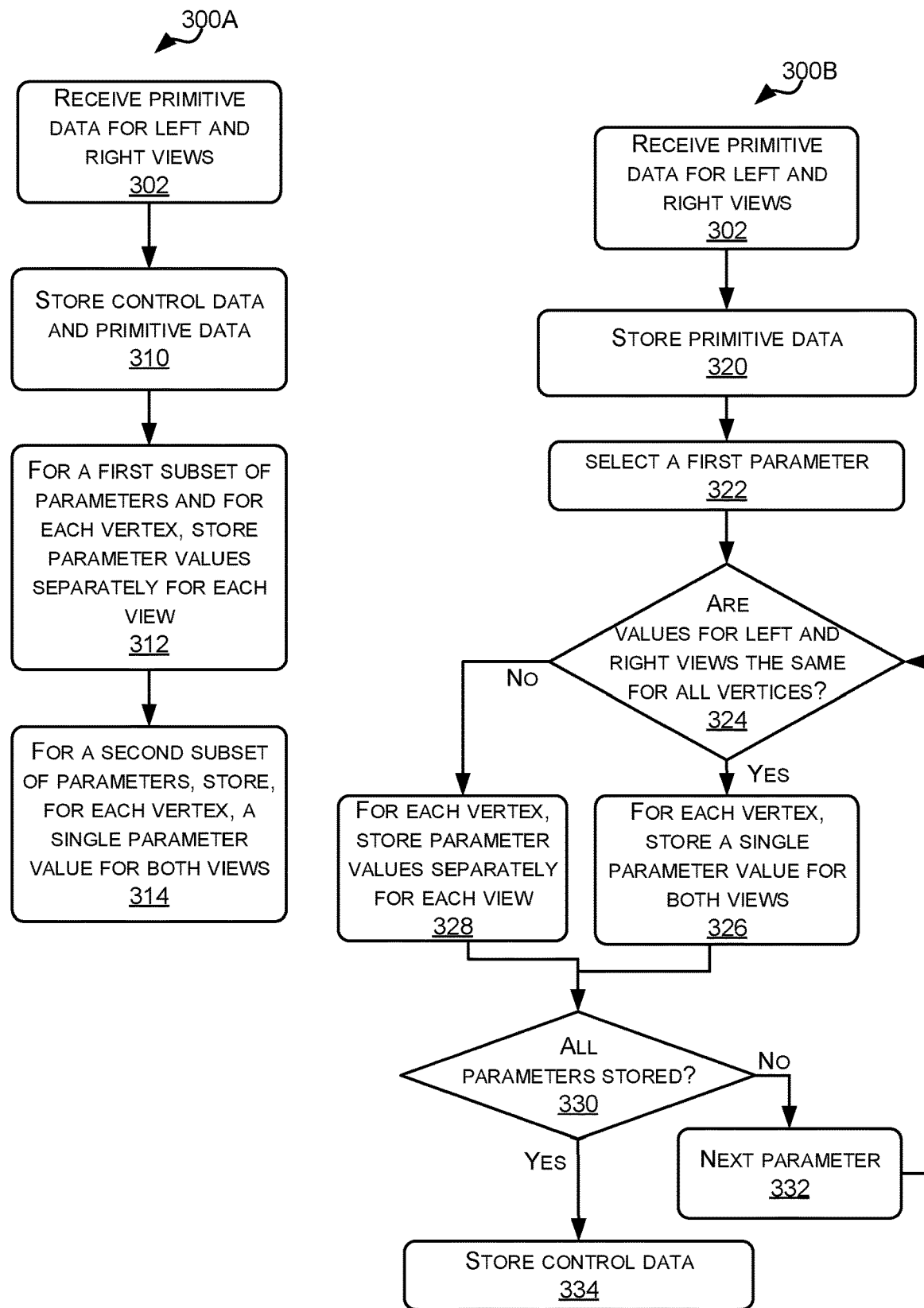
FIG. 3 shows flow diagrams of two example methods of generating the primitive block shown in FIG. 2.

FIG. 3 shows two flow diagrams 300A, 300B showing two different example methods, implemented by the primitive block assembly module 130, of generating a primitive block 200 (as shown in FIG. 2). As described above, these methods are implemented by the tiling unit 108 within a GPU 102.

In the first flow diagram 300A, the split between vertex parameters which are stored separately for the left and right views (the first subset of vertex parameters) and vertex parameters which are stored only once for both views (the second subset of vertex parameters) is predetermined and is the same for all primitive blocks. The method comprises receiving primitive data for the left and right views (block 302) and storing control data and primitive data (block 310). For a first subset of vertex parameters and for each vertex, vertex parameter values are stored separately for each view (block 312), e.g. in the left view data portion 206 and right view data portion 208 of the primitive block 200. For a second subset of vertex parameters, in contrast, a single value is stored for each vertex parameter which is used for both views (block 314), e.g. in the common data portion 210 of the primitive block 200. The first and second subsets of vertex parameters are non-overlapping and each of the vertex parameters stored in the primitive block 200 for each vertex belong to either the first subset or the second subset.

In contrast, in the second flow diagram 300B, the split between vertex parameters which are stored separately for the left and right views and vertex parameters which are stored only once for both views is not necessarily the same for all primitive blocks but instead an assessment is made as part of the method (in block 324) to determine whether to store two parameter values for each vertex (one for the left view and one for the right view) or to store a single parameter for each vertex (for both views). As shown in the second flow diagram 300B in FIG. 3, primitive data for the left and right views is received (block 302) and primitive data is stored (block 320). Then a vertex parameter is selected (block 322) and it is determined whether for each vertex in the primitive block, the vertex parameter value for the left view and the vertex parameter value for the right view is the same (block 324). Vertex parameter values may be different for different vertices and so the test (in block 324) compares vertex parameter values which relate to the same vertex only. If for each vertex in the primitive block the left and right values for the vertex parameter values are the same ('Yes' in block 324), the single vertex parameter value is stored in the primitive block for each vertex (block 326), e.g. in the common data portion 210 of the primitive block 200. If, however, the left and right values of the vertex parameter do not match for all of the vertices in the primitive block ('No' in block 324), i.e. if there are one or more vertices where the left value of the vertex parameter is not the same as the right value of the vertex parameter, then for each vertex, separate vertex parameter values are stored in the primitive block for each view (block 328), e.g. in the left view data portion 206 and right view data portion 208 of the primitive block 200. The method is repeated for all vertex parameters (e.g. blocks 330-332) and when all vertex parameters have been stored ('Yes' in block 330), control data is stored which identifies which vertex parameters have been stored in the common data portion 210 and which vertex parameters have been stored in the left and right view data portions 206, 208 of the primitive block (block 334).

Although the second flow diagram 300B shows a comparison step which compares vertex parameter values (block 324), in other examples the comparison may be performed in another way. For example, the method may alternatively comprise inspecting the code that generates the parameter values (instead of inspecting the parameters themselves) and determine the split between the per view and common data portion. Whilst comparison of vertex parameters (as shown in FIG. 3) may guarantee that all identical parameters for both views can be identified, inspection of the code that generates the vertex parameters (that may miss identical parameters in the situation where different code paths actually produce the same result for both views) may result in a less complex implementation, e.g. because it can be performed offline and the control data may be supplied (e.g. by the compiler) and this avoids having to have hardware that compares parameters in real-time.

Figure 5:
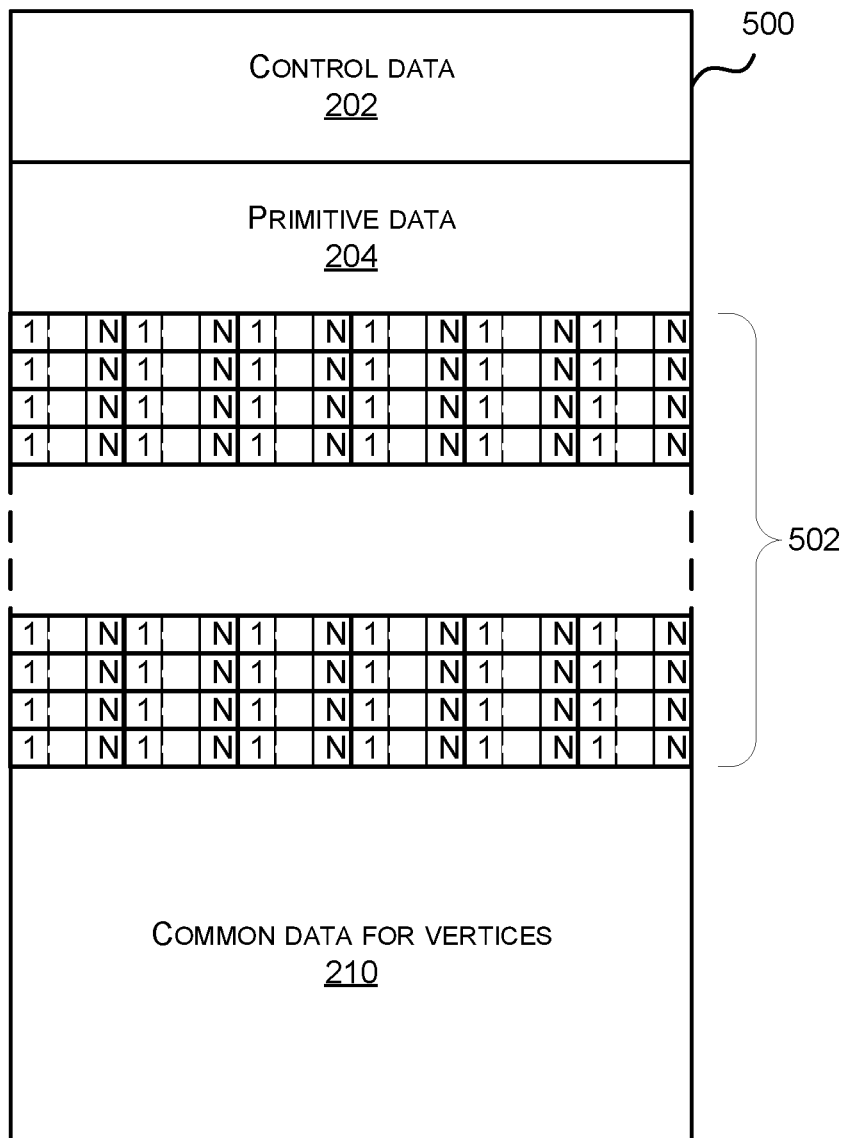
FIG. 5 is a schematic diagram showing the structure of a further example primitive block.

In the examples described above, for those vertex parameters where two values are stored for each vertex (i.e. one for the left view and one for the right view), these two values are stored separately and independently, i.e. the value for the left view is stored in the left view data portion 206 and the value for the right view is stored in the right view data portion 208, although as described above, these portions 206, 208 may not be separate contiguous portions and in various examples the left and right values (and hence the left and right view data portions 206, 208) may be interleaved (e.g. as shown in FIG. 5 and described below).

In other examples, however, the values for the two views may not be stored independently and instead one of the values (e.g. the value for the right view) may be stored as a difference from the other value (e.g. the difference between the right view value and the left view value). This may reduce the overall size of the primitive block e.g. where the difference can be stored in a smaller number of bits than the value itself. The difference value that is stored may, for example, be the byte lane integer difference to avoid loss of precision which might otherwise result from subtracting one floating point number from another. In other examples, the value that is stored for the second value (i.e. the value that is not stored in full) may be some other value which can be used in combination with the first value (i.e. the value that is stored in full) to generate the second value in full.

In various examples, the storing of one value (e.g. the left value) and a value (e.g. a difference) from which the second value can be determined (using also the first value) may be used in combination with the interleaving of left and right view data (as described above) because this results in efficient memory accesses. For example, if only the second view (e.g. the right view) is being rendered, the two values that need to be read to determine the value of the parameter for the second view (e.g. the first value and the difference value) are stored close (e.g. logically next) to each other.

The primitive data for the left and right views which is used in the two example methods 300A, 300B shown in FIG. 3 (as received in block 302) may be generated within the pre-processing unit 106 of the GPU 102. In various examples, the data for the different views may be generated in the geometry shaders 126 or the vertex processing module 124 or within a primitive assembly module (not shown in FIG. 1) prior to the data fetch module 122. In an example, the primitive assembly module may loop over the primitives for each view and resend them through the pipeline with a different set of transforms each time. In another example the geometry shaders 126 or vertex processing module 124 (e.g. using modified vertex shading process code) may receive data for a primitive, read the vertex data and then transform the input primitive into two output primitives, one for the left view space and one for the right view space. These two primitives are interleaved at the output of the geometry shaders 126/vertex processing module 124.

Whilst the method described above with reference to FIGS. 2 and 3 may be implemented irrespective of where the primitive data for the left and right views is generated, the method operates more efficiently and accurately if the data for corresponding left and right primitives is available at the same time or close together in time. This is the case if the interleaving of left and right primitive data results in corresponding left and right primitives being adjacent to each other. If the generation of left and right primitives is performed in the geometry shaders 126 or vertex processing unit 124, this condition is met, thereby improving the efficiency of generating the primitive block. If the generation of the left and right primitives is instead performed by a primitive assembly module prior to the data fetch module 122, the condition may not be met, which may result in an increase in the complexity of generating the primitive block (e.g. because the method may have to buffer primitive data for a period of time until data for corresponding left and right primitives is available).

Figure 4:
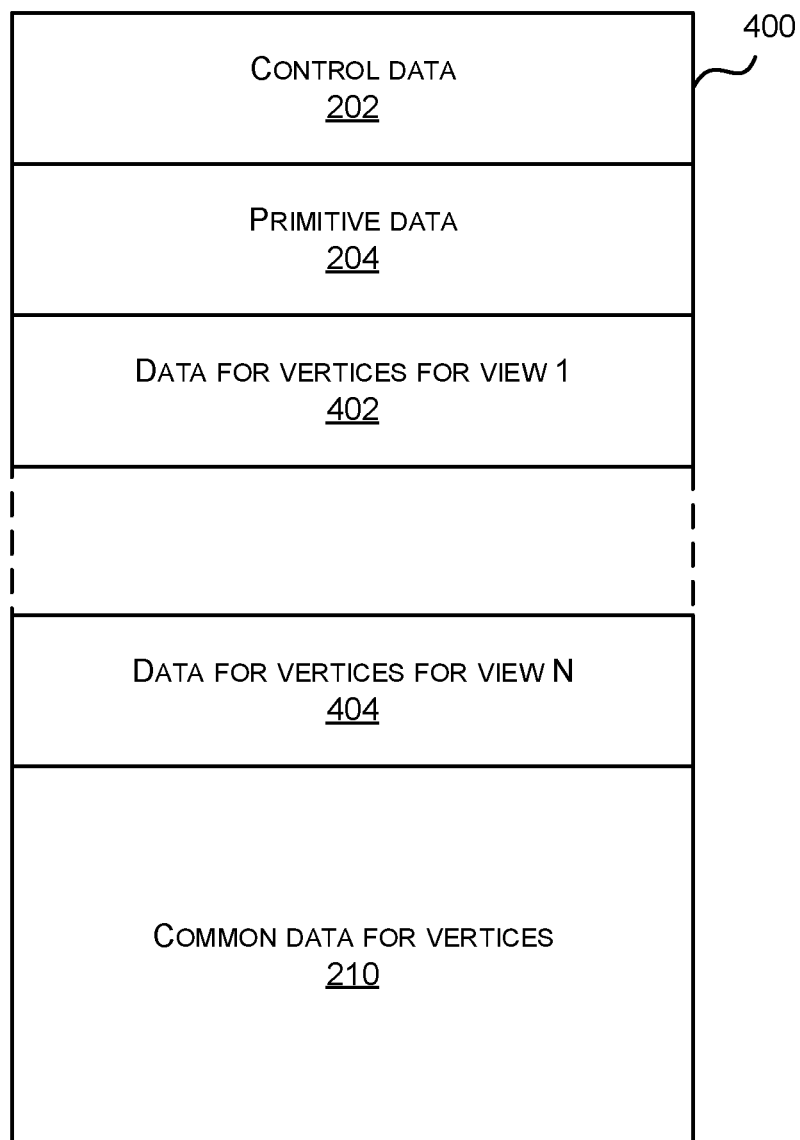
FIG. 4 is a schematic diagram showing the structure of another example primitive block.

Although the examples described above refer to left and right views (for stereoscopic rendering), the methods are also applicable when rendering more than two views and/or where vertex data is generated for more than two views (irrespective of how many of those views are actually rendered). FIG. 4 shows an example primitive block 400 for N views, where N>1, but which is otherwise the same as the primitive block 200 shown in FIG. 2 and described above. As shown in FIG. 4, the primitive block 400 comprises separate view data 402, 404 for each of the views and although these portions of the primitive block 400 are shown separately, in other examples, the view data for the different views may be interleaved, as shown in FIG. 5. In FIG. 5, the primitive block 500 comprises a portion 502 comprising interleaved parameters for each of the views (labeled 1–N) for each of the vertices (where N>1), e.g. parameters for vertex 1, view 1, followed by parameters for the same vertex for each of the other views (i.e. up to and including view N), followed by parameters for vertex 2 for each of the views in sequence, parameters for vertex 3 for each of the views in sequence, etc. This interleaved data comprises only a proper subset of all the parameters for a vertex and the remaining vertex parameter values are stored only once per vertex (in the common data portion 210) and used for all the views. In other examples, if the primitive block format did not support the entire number of views, views may be grouped, with the per view data shown in FIGS. 2 and 4 instead being replaced with data which corresponds to different, non-overlapping subsets of views (e.g. data for views 1 and 2 in one per-view data block 206 and data for views 3 and 4 in another per-view data block 208, and common data for all four views in the common data block 210). The primitive blocks 400, 500 shown in FIGS. 4 and 5 may be generated using the methods described above and shown in FIG. 3.

Using the methods described herein and the primitive block format described herein, the overall amount of data which is written to memory by a tiling unit is reduced and hence this reduces the memory bandwidth for memory writes. Read bandwidth may also be reduced on the rasterization side as common data can reside in a cache when the different views are rendered in an interleaved manner. The new primitive block format described herein which may be used for stereoscopic rendering or any other multi-view rendering also increases the efficiency of data storage by reducing the overall memory space required to store all the primitive blocks for all the primitives (and all the views).

Figure 6:
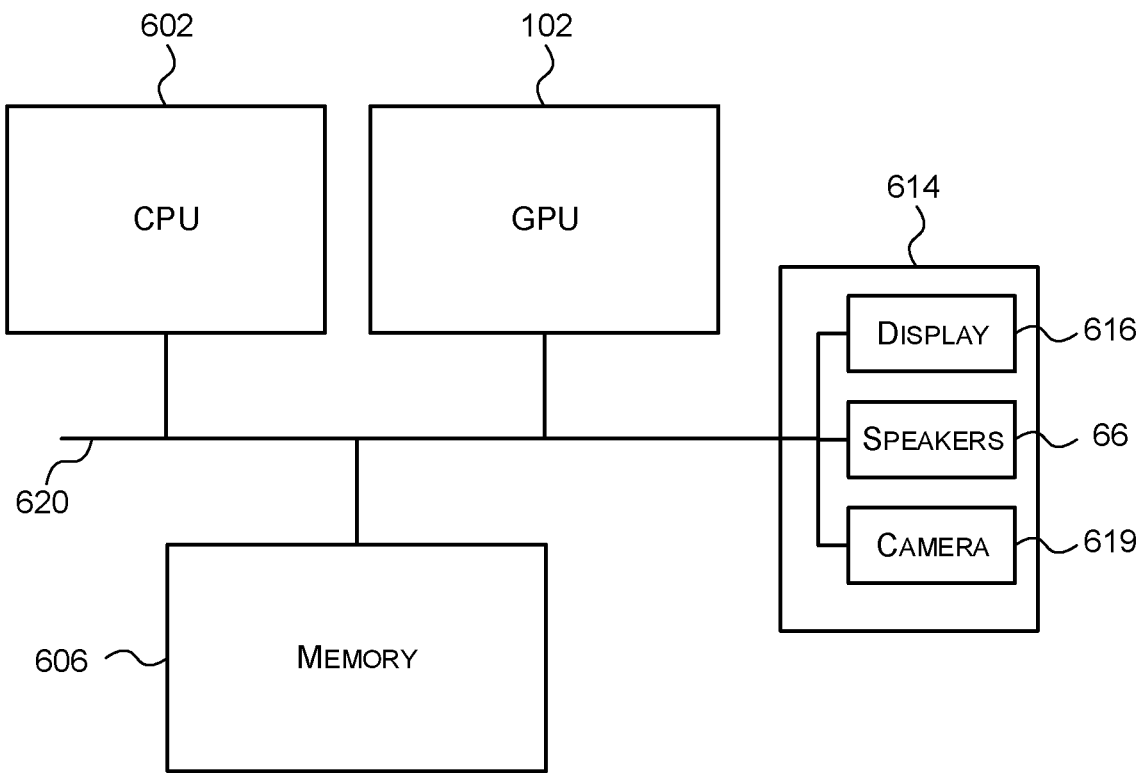
FIG. 6 shows a computer system in which a graphics processing system is implemented.

FIG. 6 shows a computer system in which the graphics processing systems described herein may be implemented. The computer system comprises a GPU 102 (e.g. as shown in FIG. 1 and described above), a CPU 602, a memory 606 and other devices 614, such as a display 616, speakers 618 and a camera 606. The components of the computer system can communicate with each other via a communications bus 620.

The GPU 102 of FIG. 1, and in particular the processing logic 112 within the tiling unit 108, is shown as comprising a number of functional blocks. This is schematic only and is not intended to define a strict division between different logic elements of such entities. Each functional block may be provided in any suitable manner. It is to be understood that intermediate values described herein as being formed by a GPU need not be physically generated by the GPU at any point and may merely represent logical values which conveniently describe the processing performed by the GPU between its input and output.

The graphics processing system described herein may be embodied in hardware on an integrated circuit. The graphics processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 7.

Figure 7:
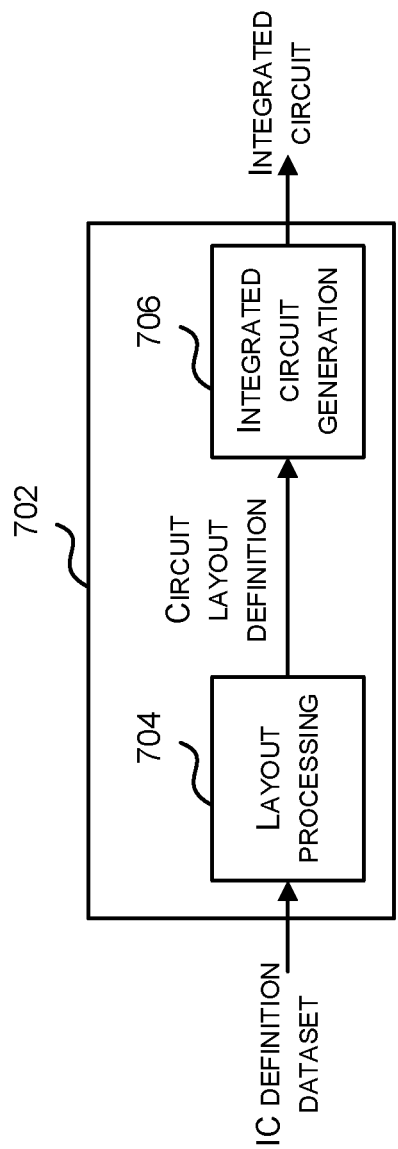
FIG. 7 shows an integrated circuit manufacturing system for generating an integrated circuit embodying a graphics processing system.

FIG. 7 shows an example of an integrated circuit (IC) manufacturing system 702 which is configured to manufacture a graphics processing system as described in any of the examples herein. In particular, the IC manufacturing system 702 comprises a layout processing system 704 and an integrated circuit generation system 706. The IC manufacturing system 702 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 702 to manufacture an integrated circuit embodying a graphics processing system as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

A first further example provides a primitive block assembly module for assembling primitive data into primitive blocks in a graphics processing system, the primitive block assembly module being configured to: receive primitive data for one or more primitives of a scene for rendering a plurality of views of the scene, wherein the primitive data comprises a plurality of parameters; and store primitive data for the one or more primitives in a primitive block, wherein: for each of a first subset of the parameters, respective parameter values are stored for the plurality of views; and for each of a second subset of the parameters, a common parameter value is stored to be shared for the plurality of views.

A second further example provides a primitive block assembly module for assembling primitives into primitive blocks in a graphics processing system, the primitive block assembly module comprising: an input configured to receive primitive data for at least a first view and a second view; processing logic arranged to generate a primitive block, the primitive block comprising: vertex data for a plurality of vertices; and primitive data for a plurality of primitives, wherein the primitive data for a primitive comprises a reference to one or more of the plurality of vertices; wherein the vertex data comprises, for each vertex in the plurality of vertices: for each of a first plurality of vertex parameters, a vertex parameter value for the first view and a vertex parameter value for the second view; and for each of a second plurality of vertex parameters, a single vertex parameter value for both the first and second views.

The processing logic arranged to generate a primitive block may comprise logic configured to store, in a primitive block, the primitive data for the plurality of primitives, and for each vertex in the plurality of vertices, to store, in the primitive block, for each of the first plurality of vertex parameters, the vertex parameter value for the first view and the vertex parameter value for the second view; and for each of the second plurality of vertex parameters, the single vertex parameter value for both the first and second views.

The processing logic arranged to generate a primitive block may comprise logic configured to determine which vertex parameters are in the first plurality of vertex parameters and which vertex parameters are in the second plurality of vertex parameters by: comparing, for each vertex and each vertex parameter, a vertex parameter value for the first view and a vertex parameter value for the second view; in response to determining that, for a vertex parameter, the vertex parameter value for the first view for at least one vertex does not match the vertex parameter for the second view for the same vertex, assigning the vertex parameter to the first plurality of vertex parameters; and in response to determining that, for a vertex parameter and for each vertex, the vertex parameter value for the first view and the vertex parameter for the second view match, assigning the vertex parameter to the second plurality of vertex parameters.

The processing logic arranged to generate a primitive block may comprise logic configured to determine which vertex parameters are in the first plurality of vertex parameters and which vertex parameters are in the second plurality of vertex parameters by: inspecting, for each vertex parameter, code configured to generate a vertex parameter value for the first view and a vertex parameter value for the second view; in response to determining that, for a vertex parameter, the code is capable of generating a vertex parameter value for the first view for at least one vertex that does not match the vertex parameter for the second view for the same vertex, assigning the vertex parameter to the first plurality of vertex parameters; and in response to determining that, for a vertex parameter, the code is not capable of generating a vertex parameter value for the first view for any vertex that does not match the vertex parameter for the second view for the same vertex, assigning the vertex parameter to the second plurality of vertex parameters.

The processing logic arranged to generate a primitive block may further comprise logic arranged to store control data identifying which vertex parameters are in the first plurality of vertex parameters and/or which vertex parameters are in the second plurality of vertex parameters.

The primitive block may comprise data for stereoscopic rendering and the first view is a left view and the second view is a right view.

The first plurality of vertex parameters may comprise parameters defining a position of the vertex. The first plurality of vertex parameters may further comprise parameters defining reflections. The second plurality of vertex parameters may comprise attribute data.

The primitive block may comprise: a first portion comprising only vertex parameter values for the first plurality of vertex parameters for the first view; a second portion comprising only vertex parameter values for the first plurality of vertex parameters for the second view; and a third portion comprising only vertex parameter values for the second plurality of vertex parameters. The first portion and second portion may be interleaved.

The processing logic may be implemented in hardware.

A third further example provides a method of assembling primitive data into primitive blocks in a graphics processing system, the method comprising: receiving primitive data for one or more primitives of a scene for rendering a plurality of views of the scene, wherein the primitive data comprises a plurality of parameters; and storing primitive data for the one or more primitives in a primitive block, wherein: for each of a first subset of the parameters, respective parameter values are stored for the plurality of views; and for each of a second subset of the parameters, a common parameter value is stored to be shared for the plurality of views.

A fourth further example provides a method of assembling primitives into primitive blocks in a graphics processing system, the method comprising: receiving primitive data for at least a first view and a second view; generating, in a primitive block assembly module, a primitive block, the primitive block comprising: vertex data for a plurality of vertices; and primitive data for a plurality of primitives, wherein the primitive data for a primitive comprises a reference to one or more of the plurality of vertices; wherein the vertex data comprises, for each vertex in the plurality of vertices: for each of a first plurality of vertex parameters, a vertex parameter value for the first view and a vertex parameter value for the second view; and for each of a second plurality of vertex parameters, a single vertex parameter value for both the first and second views.

Generating a primitive block may comprise: storing, in a primitive block, the primitive data for the plurality of primitives; and storing in the primitive block, for each vertex in the plurality of vertices: for each of the first plurality of vertex parameters, the vertex parameter value for the first view and the vertex parameter value for the second view; and for each of the second plurality of vertex parameters, the single vertex parameter value for both the first and second views.

The method may further comprise: comparing, for each vertex and each vertex parameter, a vertex parameter value for the first view and a vertex parameter value for the second view; in response to determining that, for a vertex parameter, the vertex parameter value for the first view for at least one vertex does not match the vertex parameter for the second view for the same vertex, assigning the vertex parameter to the first plurality of vertex parameters; and in response to determining that, for a vertex parameter and for each vertex, the vertex parameter value for the first view and the vertex parameter for the second view match, assigning the vertex parameter to the second plurality of vertex parameters.

The method may further comprise: inspecting, for each vertex parameter, code configured to generate a vertex parameter value for the first view and a vertex parameter value for the second view; in response to determining that, for a vertex parameter, the code is capable of generating a vertex parameter value for the first view for at least one vertex that does not match the vertex parameter for the second view for the same vertex, assigning the vertex parameter to the first plurality of vertex parameters; and in response to determining that, for a vertex parameter, the code is not capable of generating a vertex parameter value for the first view for any vertex that does not match the vertex parameter for the second view for the same vertex, assigning the vertex parameter to the second plurality of vertex parameters.

The method may further comprise: storing control data in the primitive block identifying which vertex parameters are in the first plurality of vertex parameters and/or which vertex parameters are in the second plurality of vertex parameters.

The primitive block may comprise data for stereoscopic rendering and the first view is a left view and the second view is a right view.

The first plurality of vertex parameters may comprise parameters defining a position of the vertex. The first plurality of vertex parameters further may comprise parameters defining reflections. The second plurality of vertex parameters may comprise attribute data.

The primitive block may comprise: a first portion comprising only vertex parameter values for the first plurality of vertex parameters for the first view; a second portion comprising only vertex parameter values for the first plurality of vertex parameters for the second view; and a third portion comprising only vertex parameter values for the second plurality of vertex parameters. The first portion and second portion may be interleaved.

A fifth further example provides a data structure stored in a memory element for storing primitive data for a plurality of views of a scene, wherein the primitive data comprises a plurality of parameters, the data structure comprising: for each of a first subset of the parameters, respective parameter values for the plurality of views; and for each of a second subset of the parameters, a common parameter value to be shared for the plurality of views.

A sixth further example provides a data structure stored in a memory element for storing primitive data for at least a first view and a second view, the data structure comprising: vertex data for a plurality of vertices; and primitive data for a plurality of primitives, wherein the primitive data for a primitive comprises a reference to one or more of the plurality of vertices; wherein the vertex data comprises, for each vertex in the plurality of vertices: for each of a first plurality of vertex parameters, a vertex parameter value for the first view and a vertex parameter value for the second view; and for each of a second plurality of vertex parameters, a single vertex parameter value for both the first and second views.

The data structure may comprise data for stereoscopic rendering and wherein the first view is a left view and the second view is a right view.

The first plurality of vertex parameters may comprise parameters defining a position of the vertex. The first plurality of vertex parameters may further comprise parameters defining reflections. The second plurality of vertex parameters may comprise attribute data.

The data structure may further comprise: a first portion comprising only vertex parameter values for the first plurality of vertex parameters for the first view; a second portion comprising only vertex parameter values for the first plurality of vertex parameters for the second view; and a third portion comprising only vertex parameter values for the second plurality of vertex parameters. The first portion and second portion may be interleaved.

Further examples provide a graphics processing system configured to perform the method described herein and a graphics processing system comprising the primitive block assembly module as described herein, wherein the graphics processing system may be embodied in hardware on an integrated circuit. Yet further aspects provide computer readable code configured to cause the method as described herein to be performed when the code is run and a computer readable storage medium having encoded thereon said computer readable code.

Further examples provide a method of manufacturing, using an integrated circuit manufacturing system, a graphics processing system as described herein and an integrated circuit definition dataset that, when processed in an integrated circuit manufacturing system, configures the integrated circuit manufacturing system to manufacture a graphics processing system as described herein.

Further examples provide a computer readable storage medium having stored thereon a computer readable description of an integrated circuit that, when processed in an integrated circuit manufacturing system, causes the integrated circuit manufacturing system to manufacture a graphics processing system as described herein; an integrated circuit manufacturing system configured to manufacture a graphics processing system as described herein; and an integrated circuit manufacturing system comprising: a non-transitory computer readable storage medium having stored thereon a computer readable description of an integrated circuit that describes a graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description, wherein the graphics processing system comprises the primitive block assembly module as described herein.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A primitive block assembly hardware module for assembling primitive data into primitive blocks in a graphics processing system, the primitive block assembly hardware module being configured to:
   receive primitive data for one or more primitives of a scene for rendering a plurality of views of the scene, wherein the primitive data comprises a plurality of parameters; and
   store primitive data for the one or more primitives in a primitive block, wherein:
   for each of a first subset of the plurality of parameters, respective parameter values are stored for the plurality of views;
   for each of a second subset of the plurality of parameters, a common parameter value is stored to be shared for the plurality of views; and
   store control data in the primitive block indicative of which parameter values are in the first subset of the parameters and which parameter values are in the second subset of parameters.

2. The primitive block assembly hardware module according to claim 1, wherein the primitive block assembly hardware module comprises:
   an input configured to receive the primitive data and wherein the plurality of views comprises at least a first view and a second view;
   processing logic arranged to generate the primitive block, the primitive block comprising:
   vertex data for a plurality of vertices; and
   primitive data for a plurality of primitives, wherein the primitive data for a primitive comprises a reference to one or more of the plurality of vertices;
   wherein the vertex data comprises, for each vertex in the plurality of vertices:
   for each of a first plurality of vertex parameters, a vertex parameter value for the first view and a vertex parameter value for the second view; and
   for each of a second plurality of vertex parameters, a single vertex parameter value for both the first and second views.

3. The primitive block assembly hardware module according to claim 2, wherein the processing logic arranged to generate a primitive block comprises logic configured to store, in a primitive block, the primitive data for the plurality of primitives, and for each vertex in the plurality of vertices, to store, in the primitive block, for each of the first plurality of vertex parameters, the vertex parameter value for the first view and the vertex parameter value for the second view; and for each of the second plurality of vertex parameters, the single vertex parameter value for both the first and second views.

4. The primitive block assembly hardware module according to claim 2, wherein the processing logic arranged to generate a primitive block comprises logic configured to determine which vertex parameters are in the first plurality of vertex parameters and which vertex parameters are in the second plurality of vertex parameters by:
   comparing, for each vertex and each vertex parameter, a vertex parameter value for the first view and a vertex parameter value for the second view;
   in response to determining that, for a vertex parameter, the vertex parameter value for the first view for at least one vertex does not match the vertex parameter for the second view for the same vertex, assigning the vertex parameter to the first plurality of vertex parameters; and
   in response to determining that, for a vertex parameter and for each vertex, the vertex parameter value for the first view and the vertex parameter for the second view match, assigning the vertex parameter to the second plurality of vertex parameters.

5. The primitive block assembly hardware module according to claim 4, wherein the processing logic arranged to generate a primitive block further comprises logic arranged to store control data identifying which vertex parameters are in the first plurality of vertex parameters and/or which vertex parameters are in the second plurality of vertex parameters.

6. The primitive block assembly hardware module according to claim 2, wherein the processing logic arranged to generate a primitive block comprises logic configured to determine which vertex parameters are in the first plurality of vertex parameters and which vertex parameters are in the second plurality of vertex parameters by:
   inspecting, for each vertex parameter, code configured to generate a vertex parameter value for the first view and a vertex parameter value for the second view;
   in response to determining that, for a vertex parameter, the code is capable of generating a vertex parameter value for the first view for at least one vertex that does not match the vertex parameter for the second view for the same vertex, assigning the vertex parameter to the first plurality of vertex parameters; and
   in response to determining that, for a vertex parameter, the code is not capable of generating a vertex parameter value for the first view for any vertex that does not match the vertex parameter for the second view for the same vertex, assigning the vertex parameter to the second plurality of vertex parameters.

7. The primitive block assembly hardware module according to claim 1, wherein the primitive block comprises data for stereoscopic rendering, the plurality of views comprises a first view and a second view, and the first view is a left view and the second view is a right view.

8. The primitive block assembly hardware module according to claim 1, wherein the primitive block comprises:
a first portion comprising only vertex parameter values for the first plurality of vertex parameters for the first view;
a second portion comprising only vertex parameter values for the first plurality of vertex parameters for the second view; and
a third portion comprising only vertex parameter values for the second plurality of vertex parameters.

9. A method of assembling primitive data into primitive blocks in a graphics processing system, the method comprising:
receiving primitive data for one or more primitives of a scene for rendering a plurality of views of the scene, wherein the primitive data comprises a plurality of parameters;
storing primitive data for the one or more primitives in a primitive block; and
storing control data in the primitive block indicative of which parameter values are in the first subset of the plurality of parameters and which parameter values are in the second subset of parameters, wherein:
for each of a first subset of the plurality of parameters, respective parameter values are stored for the plurality of views; and
for each of a second subset of the plurality of parameters, a common parameter value is stored to be shared for the plurality of views.

10. The method according to claim 9, wherein the plurality of views comprises at least a first view and a second view, and wherein storing primitive data for the one or more primitives in a primitive block comprises:
generating, in a primitive block assembly module, a primitive block, the primitive block comprising:
vertex data for a plurality of vertices; and
primitive data for a plurality of primitives, wherein the primitive data for a primitive comprises a reference to one or more of the plurality of vertices;
wherein the vertex data comprises, for each vertex in the plurality of vertices:
for each of a first plurality of vertex parameters, a vertex parameter value for the first view and a vertex parameter value for the second view; and
for each of a second plurality of vertex parameters, a single vertex parameter value for both the first and second views.

11. The method according to claim 10, wherein generating a primitive block comprises:
storing, in a primitive block, the primitive data for the plurality of primitives; and
storing in the primitive block, for each vertex in the plurality of vertices:
for each of the first plurality of vertex parameters, the vertex parameter value for the first view and the vertex parameter value for the second view; and
for each of the second plurality of vertex parameters, the single vertex parameter value for both the first and second views.

12. The method according to claim 10, further comprising:
comparing, for each vertex and each vertex parameter, a vertex parameter value for the first view and a vertex parameter value for the second view;
in response to determining that, for a vertex parameter, the vertex parameter value for the first view for at least one vertex does not match the vertex parameter for the second view for the same vertex, assigning the vertex parameter to the first plurality of vertex parameters; and
in response to determining that, for a vertex parameter and for each vertex, the vertex parameter value for the first view and the vertex parameter for the second view match, assigning the vertex parameter to the second plurality of vertex parameters.

13. The method according to claim 12, further comprising:
storing control data in the primitive block identifying which vertex parameters are in the first plurality of vertex parameters and/or which vertex parameters are in the second plurality of vertex parameters.

14. The method according to claim 10, further comprising:
inspecting, for each vertex parameter, code configured to generate a vertex parameter value for the first view and a vertex parameter value for the second view;
in response to determining that, for a vertex parameter, the code is capable of generating a vertex parameter value for the first view for at least one vertex that does not match the vertex parameter for the second view for the same vertex, assigning the vertex parameter to the first plurality of vertex parameters; and
in response to determining that, for a vertex parameter, the code is not capable of generating a vertex parameter value for the first view for any vertex that does not match the vertex parameter for the second view for the same vertex, assigning the vertex parameter to the second plurality of vertex parameters.

15. A data structure stored in a memory element for storing primitive data for a plurality of views of a scene, wherein the primitive data comprises a plurality of parameters, the data structure comprising:
for each of a first subset of the plurality of parameters, respective parameter values for the plurality of views;
for each of a second subset of the plurality of parameters, a common parameter value to be shared for the plurality of views; and
control data indicative of which parameter values are in the first subset of the parameters and which parameter values are in the second subset of parameters.

16. The data structure according to claim 15, wherein the plurality of views comprise at least a first view and a second view, the data structure further comprising:
vertex data for a plurality of vertices; and
primitive data for a plurality of primitives, wherein the primitive data for a primitive comprises a reference to one or more of the plurality of vertices;
wherein the vertex data comprises, for each vertex in the plurality of vertices:
for each of a first plurality of vertex parameters, a vertex parameter value for the first view and a vertex parameter value for the second view; and
for each of a second plurality of vertex parameters, a single vertex parameter value for both the first and second views.

17. The data structure according to claim 16, comprising data for stereoscopic rendering and wherein the first view is a left view and the second view is a right view.

18. The data structure according to claim 16, wherein the first plurality of vertex parameters comprises parameters defining a position of the vertex.

19. The data structure according to claim 18, wherein the first plurality of vertex parameters further comprises parameters defining reflections.

20. The data structure according to claim 16, wherein the second plurality of vertex parameters comprises attribute data.

* * * * *